(12) United States Patent
Chinthekindi et al.

(10) Patent No.: US 10,628,298 B1
(45) Date of Patent: Apr. 21, 2020

(54) RESUMABLE GARBAGE COLLECTION

(71) Applicant: EMC IP Holding Company LLC, Hopkinton, MA (US)

(72) Inventors: Ramprasad Chinthekindi, San Jose, CA (US); Abhinav Duggal, Milpitas, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 11 days.

(21) Appl. No.: 16/172,293

(22) Filed: Oct. 26, 2018

(51) Int. Cl.
*G06F 12/02* (2006.01)
*G06F 3/06* (2006.01)
*G06F 16/901* (2019.01)

(52) U.S. Cl.
CPC ............ *G06F 12/023* (2013.01); *G06F 3/067* (2013.01); *G06F 3/0608* (2013.01); *G06F 3/0641* (2013.01); *G06F 16/9014* (2019.01)

(58) Field of Classification Search
CPC .... G06F 12/02; G06F 12/023; G06F 12/0276; G06F 16/9014; G06F 3/0608; G06F 3/0641; G06F 3/067
See application file for complete search history.

(56) References Cited

U.S. PATENT DOCUMENTS

| | | | |
|---|---|---|---|
| 10,108,543 B1* | 10/2018 | Duggal | G06F 3/0619 |
| 2017/0004077 A1* | 1/2017 | Liu | G06F 12/0253 |
| 2018/0004786 A1* | 1/2018 | Danilov | G06F 12/0261 |

* cited by examiner

*Primary Examiner* — Idriss N Alrobaye
*Assistant Examiner* — Richard B Franklin
(74) *Attorney, Agent, or Firm* — Dergosits & Noah LLP; Todd A. Noah

(57) ABSTRACT

Generate first data structure based on unique identifiers of objects in object storages. Set indicators in positions in first data structure corresponding to hashes of unique identifiers of active objects in storages. When garbage collection is suspended, store suspension information to persistent storage. Set indicators in second data structure positions corresponding to hashes of unique identifiers of data objects that are deduplicated to storages while garbage collection is suspended. When garbage collection is resumed, retrieve suspension information from persistent storage. Set indicators in positions in first data structure corresponding to hashes of unique identifiers of data objects corresponding to indicators set in second data structure positions. Copy active objects from first object storage to second if number of active objects in first object storage does not satisfy threshold. Reset indicators in first data structure positions corresponding to hashes of unique identifiers of active objects copied to second storage.

29 Claims, 8 Drawing Sheets

RESUMABLE GARBAGE COLLECTION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

An object that is stored in a computer system may be represented by a data structure, such as the tree structure 100 depicted by FIG. 1. A computer system can divide an object into smaller objects, such as dividing a file into files segments. Examples of file segments include a super segment 102 or a level 6 (L6) segment, which may be at the root of the tree structure 100, metadata segments 104, or level 5 (L5) segments to level 1 (L1) segments, which may be intermediate nodes in the tree structure 100, and data segments 106, or level 0 (L0) segments, which are the leaf nodes of the tree structure 100. The level 6 (L6) segments to level 1 (L1) segments may be referred to as level P (Lp) segments. Although this example describes the tree structure 100 as having 7 (L0-L6) levels, the tree structure 100 may have any number of levels.

Each object may be referenced by its fingerprint, which is a relatively short bit string that uniquely identifies an object. For example, FIG. 2A depicts the file segments 200 that can be referenced by the fingerprints 202, such as the fingerprint G 204 that uniquely identifies the file segment G 206.

A garbage collector generally refers to an organizer of storage for retrievable data in a computer system, which automatically identifies a computer system's objects, identifies which objects are live objects, which are the objects that are in use by at least one of the computer system's programs, and reclaims storage occupied by dead objects, which are the objects that are no longer in use by any of the computer system's programs. A garbage collector can begin by executing what may be referred to as a merge phase, which includes storing an index of unique identifiers of a computer system's objects, such as by storing an index of fingerprints for file segments to a disk. The fingerprint index can map each fingerprint to the object storage, which may be referred to as a container, that stores the file segment which is uniquely identified by the fingerprint, such as the fingerprint index that includes the fingerprint G 204 also includes a mapping to the container that stores the file segment G 206.

The garbage collector can continue by executing what may be referred to as an analysis phase, which includes applying a hash function to each fingerprint in the fingerprint index to generate a one-dimensional array that may be referred to as a hash vector, such that the positions in the hash vector correspond to the fingerprints that uniquely identify their file segments. For example, FIG. 2B depicts that the garbage collector applies the hash function 208 to the fingerprints 210 to generate the hash vector 212. Consequently, the bit 214 in the hash vector 212 corresponds to the hash, which is the value returned by a hash function, of the fingerprint G 216, which is the fingerprint G 204 that uniquely identifies the file segment G 206 in FIG. 2A. Although the example describes a computer system as having 7 file segments, fingerprints, and corresponding bits in the hash vector, a computer system may have any number of file segments, fingerprints, and corresponding bits in the hash vector.

The garbage collector can continue by executing what may be referred to as an enumeration phase, which includes identifying the active objects, and then indicating these identifications in the bits of the hash vector that correspond to the objects' unique identifiers. For example, the garbage collector conducts a level-by-level review of the metadata segments 104 to identify their L0 and Lp references, which include the fingerprints of the live L0 data segments 106 and the live Lp metadata segments 104, each of which are in use by at least one of the computer system's programs. Then the garbage collector can continue the enumeration phase by applying the hash function 208 to these identified fingerprints to create hashes, and then setting the bits in the hash vector that correspond to these hashes, such as setting some of the bits 302 to 1 in the perfect hash vector 304 depicted by FIG. 3.

The garbage collector can continue by executing what is referred to as a selection phase, which includes estimating how much of the data storage in each container is for live objects. For example, the garbage collector identifies the fingerprints for the L0 data segments in the container 140, applies the hash function 208 to these identified fingerprints to create hashes, and then checks the bits in the perfect hash vector 304 that correspond to these hashes. If the bit for a fingerprint's hash is set to 1 in the perfect hash vector 304, then the bit corresponds to a fingerprint of a live object. If the bit for a fingerprint's hash is not set to 1 in the perfect hash vector 304, then the bit corresponds to a fingerprint of a dead object.

As part of the selection phase, the garbage collector can continue by selecting a container for garbage collection, which may be referred to as cleaning, based on the number of the objects in the container that are live objects. For example, if the garbage collector has determined that only 10% of the file segments in the container 140 are dead file segments, which are not in use by any of the computer system's programs, then the garbage collector bypasses selection of the container 140 for garbage collection or cleaning, and therefore retains the container 140 as it is. Continuing this example, the garbage collector resets the bits in the perfect hash vector 304 that correspond to the hashes of the fingerprints for the file segments in the container 140, which enables the subsequent processing of containers to not require retention of these file segments, which may be referenced as duplicates in other containers.

In an alternative example, if the garbage collector has determined that 40% of the file segments in the container 140 are dead file segments, then the garbage collector selects the container 140 for garbage collection or cleaning. The garbage collector may evaluate multiple containers in the cleaning range 306 to select any combination of these containers in the cleaning range 306 for garbage collection or cleaning. Although the example describes 40% of a container's dead file segments as exceeding a cleaning criteria or container selection threshold, any cleaning criteria or container selection threshold may be used.

The garbage collector might complete by executing what may be referred to as a copy phase, which includes copying live objects from a selected container that will be reclaimed into another container that will be retained. Continuing the alternative example, the garbage collector creates the new container 250, copies the live file segments in the container 140 into the new container 250, and resets the bits in the perfect hash vector 304 that correspond to the hashes for the fingerprints of the file segments in the new container 250, which enables the subsequent processing of containers to not require retention of these file segments. Possibly completing the copy phase for the alternative example, the garbage collector deletes the container 140, which is a cleaning or a garbage collection that reclaims unused storage space for subsequent reuse. Although examples use numbers such as 140 and 250 to reference containers, any other type of sequential referencing of containers may be used.

If the garbage collector executes the merge, analysis, enumeration, selection, and copy phases while no additional objects are being written to a computer system's containers, then the garbage collector can complete the execution of its phases as described above. However, garbage collection may require significantly more time to complete than the duration of time that a computer system can temporarily suspend the writing of objects to containers. Therefore, the garbage collector can accommodate the writing of objects to containers, which may be referred to as an ingest, while the garbage collector is concurrently executing its phases. Furthermore, the garbage collector can accommodate the writing of deduplicated objects to containers while the garbage collector is concurrently executing its phases. Data deduplication generally refers to a specialized data compression technique for eliminating redundant copies of repeating data.

The garbage collector can identify the writing of objects to containers which occur after the garbage collector started the merge phase until the garbage collector started the enumeration phase, which is depicted as the all live range 308 in FIG. 3 because all of the objects written during this time period are live objects since they have just been written. The garbage collector disables the deduplication of all Lp metadata from the start of the merge phase through the start of the enumeration phase so that metadata is written is written to new containers, such that the garbage collector can review these new containers for references to data segments during the enumeration phase. For example, between the times that the garbage collector started the merge and enumeration phases, a backup/restore application duplicated data from the container 140 and the corresponding metadata to the new container 180, and also wrote new data to the new container 190 and the corresponding metadata to the new container 200. After starting the enumeration phase, the garbage collector reviews the new containers 180-210, identifies the L0 and Lp references in the metadata segments in the containers 180 and 200, which identify the fingerprints of the live L0 data segments and the live Lp metadata segments in the containers 140 and 190, applies the hash function 208 to these identified fingerprints to create hashes, and sets the bits in the hash vector that represent these hashes. When subsequently processing the containers in the cleaning range, the garbage collector will reference the bits for the hashes of the fingerprints for the L0 data segments in the container 140 as indicating live file segments. However, since the new container 190 is not in the cleaning range, the garbage collector will not reference the bits for the hashes of the fingerprints for the L0 data segments in the container 190 as indicating live file segments, such that the garbage collector might not reset the bits for the hashes of the fingerprints for the L0 data segments in the container 190.

Writing an object to a container can resume the use of a dead object. For example, a program in the computer system created the file 60 that included the file segment Z, the backup/restore application wrote the file 60 to the container 160, the program deleted the file segment Z, and the backup/restore application wrote metadata that indicates the deletion of the file segment Z to the container 160. Since the garbage collector has yet to delete the file segment Z from the container 160, the file segment Z is a dead file segment, and the fingerprint index still includes the fingerprint Z for the file segment Z, and still maps the fingerprint Z to the container 160. Then a user of the program instructed the backup/restore application to restore the file segment Z from a backup file, and the program is currently using the restored file segment Z.

The backup/restore application may create a notification to write file segments which include the revived file segment Z when the garbage collector is not executing its phases. Since the fingerprint index still includes the fingerprint Z for the file segment Z, and still maps the fingerprint Z to the container 160, the backup/restore application writes the file segment Z and the corresponding metadata to the container 160 as deduplicated data.

Alternatively, the backup/restore application may create a notification to write file segments which include the revived file segment Z between the times that the garbage collector started the merge and enumeration phases. The garbage collector tracks the resumption of use, or revival, of all dead objects by disabling the deduplication of all Lp metadata from the start of the merge phase through the start of the enumeration phase. Therefore, since the fingerprint index still includes the fingerprint Z for the file segment Z, and still maps the fingerprint Z to the container 160, the garbage collector permits the backup/restore application to write the file segment Z to the container 160 as deduplicated data and write the corresponding metadata to the new container 240. When the garbage collector reviews the metadata in the new containers, which includes the new container 240, the metadata identifies the fingerprint Z of the file segment Z written to the container 160, applies the hash function 208 to the fingerprint Z, and then sets the bits in the perfect hash vector 304 that correspond to the hash for the fingerprint Z of the previously dead file segment Z written to the container 160. When subsequently processing the container 160, the garbage collector will reference this bit as indicating a live file segment, thereby retaining the revival of the previously dead file segment Z.

Since the garbage collector has the capability to track the revival of dead objects, the garbage collector may process the writing of a new object as the revival of a dead object. For example, between the times that the garbage collector started the merge and enumeration phases, a backup/restore application creates a notification to write a new file segment D, and during the enumeration phase the garbage collector applies the hash function 208 to the new fingerprint D for the new file segment D, and then sets the bit in the perfect hash vector 304 that corresponds to the hash for the new fingerprint D. Coincidentally, the hash for the new fingerprint D is the same as the hash for the old fingerprint X of the old file segment X that is a dead segment which is stored by the container 130. Consequently, when the garbage collector processes the container 130 in the cleaning range 306, and reviews the bit set in the perfect hash vector 304 that corresponds to the hash for the new fingerprint D and the old fingerprint X, the garbage collector will process the dead file segment X as a live segment. This collision of bits for the hash of the new fingerprint D and the old fingerprint X may result in the garbage collector not selecting the container 130 for cleaning when the container 130 should have been selected for cleaning, or result in the garbage collector creating a new container for the live file segments of the container 130 and copying the dead file segment X to the new container.

After the enumeration phase starts, the garbage collector can identify additional notifications to write objects to containers. If the garbage collector identifies a notification to write to a container that is in the range of containers that the garbage collector has already cleaned, the garbage collector permits this writing of objects to this container. For example, the garbage collector has already cleaned the containers 180-210, is in the process of cleaning the containers 130-170 in the current batch 402, and then identifies a notification from a backup/restore application to write objects to the container 190 as deduplicated data, as depicted by FIG. 4. Since the garbage collector has already cleaned the containers 180-210, the garbage collector permits the backup/restore application to write the objects to the container 190 as deduplicated data. The garbage collector does not need to apply the hash function 208 to the fingerprints for the file segments written to the container 190 or need to set the bits in the perfect hash vector 304 that correspond to the hashes for the fingerprints of the file segments written to the container 190 because the current processing of containers will not reference these file segments that are only written to a container that is already cleaned.

If the garbage collector identifies a notification to write to a container that is in the range of containers that the garbage collector is currently cleaning, the garbage collector may modify at least some of the writing of objects to this container. For example, the garbage collector has already cleaned the containers 180-210, is in the process of cleaning the containers 130-170 in the current batch 402, and then identifies a notification from a backup/restore application to write objects to the container 150 as deduplicated data. Since the garbage collector is currently in the process of cleaning the containers 140-170, the garbage collector instructs the backup/restore application to write the objects to the container 150 as data that has not been deduplicated.

The data that is written to containers in the current batch 402 is written as data that has not been deduplicated to enable the tracking of dead objects that are being revived. For example, if the backup/restore application wrote the file segment Y to the container 150 as deduplicated data, and the container 150 previously stored the file segment Y as a dead object, the deduplication of data would result in writing metadata, which indicates the revival of the file segment Y, to the container 150 instead of resulting in actually writing the file segment Y again to the container 150. The garbage collector processes the file segments that are actually written to the containers being cleaned as live file segments, such that a file segment that is actually written to a container that will be retained is also retained, and a file segment that is actually written to a container which will have its live file segments copy forwarded to a new container is also copy forwarded to the new container. For example, the backup/restore application writes the file segment Y to the container 150 as duplicate data, and the garbage collector copies the live file segments in the container 150 into the new container 250, and also copies the revived file segment Y in the container 150 into the new container 250. If the backup/restore application had not actually written the file segment Y to the container 150 as duplicate data, then the garbage collector would have failed to retain the revival of the previously dead file segment Y.

If the garbage collector identifies a notification to write to a container that is below the range of containers that the garbage collector is currently cleaning, the garbage collector permits deduplicating data with objects in this container. For example, the garbage collector has already cleaned the containers 180-210, is in the process of cleaning the containers 140-170 in the current batch 402, and then identifies a notification from a backup/restore application to write objects to the container 110 as deduplicated data. Since the garbage collector has not yet begun the process of cleaning the containers 100-130, the garbage collector permits the backup/restore application to write the objects to the container 110 as deduplicated data. The garbage collector applies the hash function 208 to the fingerprints of these file segments written to the container 110, and then sets the bits in the perfect hash vector 304 that correspond to the hashes for the fingerprints of the file segments written to the container 110 because the subsequent processing of container 110 will reference the bits for these file segments.

If the backup/restore application wrote file segment V to the container 110 as deduplicated data, and the container 110 already stored file segment V as a dead object, the deduplication of data would result in not writing the file segment V again to the container 110. However, the garbage collector would identify the L0 references in the write notification for the container 110, which identify the fingerprints of the live L0 data segments in the container 110, apply the hash function 208 to these identified fingerprints to create hashes, and set the bits in the hash vector that correspond to these hashes, thereby retaining the revival of the previously dead file segment V.

FIG. 4 depicts that the garbage collector cleans containers from the log head, which are the higher numbered and more recently created containers in the cleaning range, to the log tail, which are the lower numbered and less recently created containers in the cleaning range. For example, the relatively old container 100 and the relatively new container 200 both store the file segment W, and the garbage collector processes the newer container 200 first, either by retaining the newer container 200 which stores the file segment W or by creating an additional container 220 that stores the file segment W, and then resetting the bit in the perfect hash vector 304 that corresponds to the hash for the fingerprint W of the file segment W. Since the older container 100 was created before the newer container 200 was created, the older container 100 is more likely to store dead segments than the newer container 200, such that the percentage of live segments in the old container 100 is more likely to satisfy the container selection threshold for cleaning than the percentage of live segments in the new container 200. Having reset the bit corresponding to the hash for the fingerprint W after processing the newer container 200, the garbage collector processes the file segment W as a dead segment when determining whether to select the older container 100 for cleaning, which may result in the percentage of live segments in the older container 100 satisfying the container selection threshold for cleaning. In contrast, the garbage collector processing the file segment W as a dead segment for the newer container 200 would be less likely to result in the percentage of live segments in the newer container 200 satisfying the container selection threshold for cleaning. Consequently, the garbage collector cleaning the newer containers in the cleaning range before cleaning the older containers in the cleaning range is more likely to reclaim some of the storage space occupied by older containers, which would have otherwise remain inefficiently allocated.

DETAILED DESCRIPTION

Garbage collection may be suspended prior to completing the cleaning of containers in the cleaning range. Garbage collection may be suspended for a variety of reasons. A system administrator may suspend garbage collection. If a garbage collector is cleaning remote containers, and another garbage collector is scheduled to begin cleaning local containers, the system memory may be insufficient to execute both garbage collectors, such that the garbage collector scheduled to clean local containers suspends the garbage collection of remote containers due to the higher priority for the garbage collection of local containers. If a garbage collector is cleaning remote containers that are stored on cloud storage, and a commonly occurring cloud disconnect occurs, then garbage collection is suspended. When a system that is hosting a garbage collector becomes heavily loaded, the system may suspend garbage collection.

Objects written to containers during a suspension of garbage collection can create challenges when the garbage collection resumes. For example, during a suspension of garbage collection, a backup/restore application writes a new file segment D. When the suspension ends, the garbage collector can re-execute the entire enumeration phase by re-conducting a level-by-level review of all of the metadata segments to identify their L0 and Lp references, which include all of the fingerprints of all of the live L0 data segments and the live Lp metadata segments, such as the new fingerprint D for the new file segment D. Then the garbage collector applies the hash function to the new fingerprint D to create a hash of the new fingerprint D, and sets the bit in the hash vector that represents the hash of the new fingerprint D. Coincidentally, the hash for the new fingerprint D can be the same as the hash for the old fingerprint X of the old file segment X that is a dead segment which is stored by the container 130 508.

Figure 1:
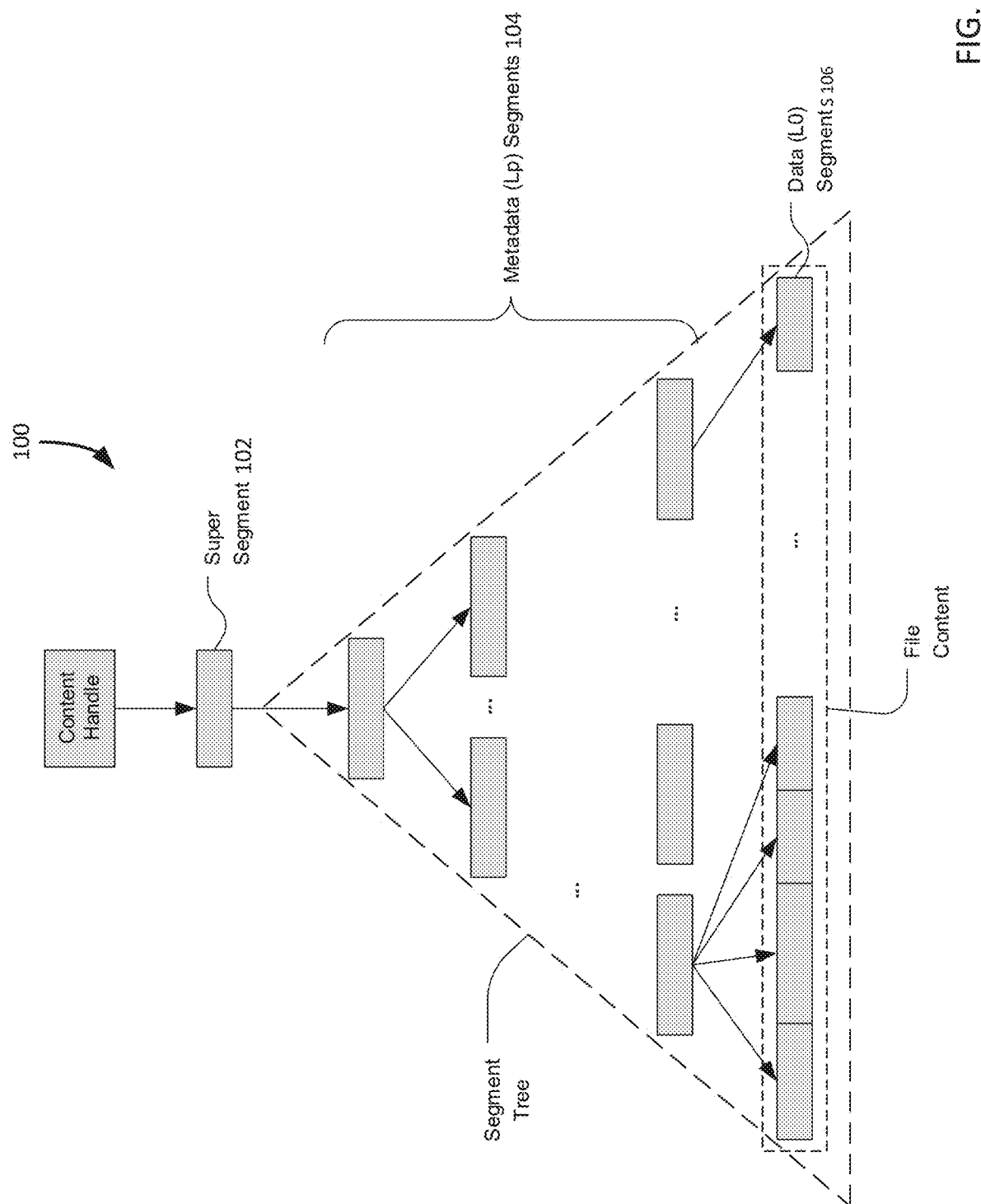
FIG. 1 illustrates a block diagram of an example data structure for resumable garbage collection, under an embodiment.
Figure 2A:
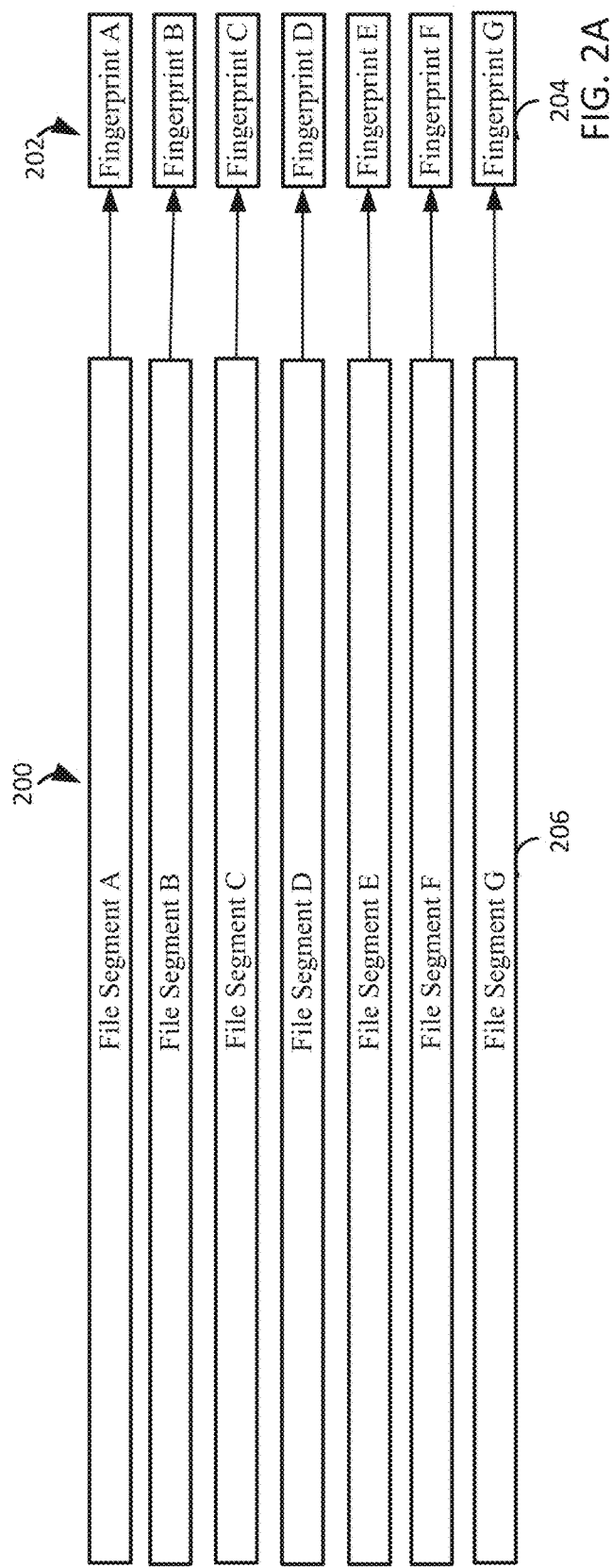
FIGS. 2A-B illustrate a block diagram of example relationships between segments, fingerprints, and bits in a hash vector for resumable garbage collection, under an embodiment
Figure 2B:
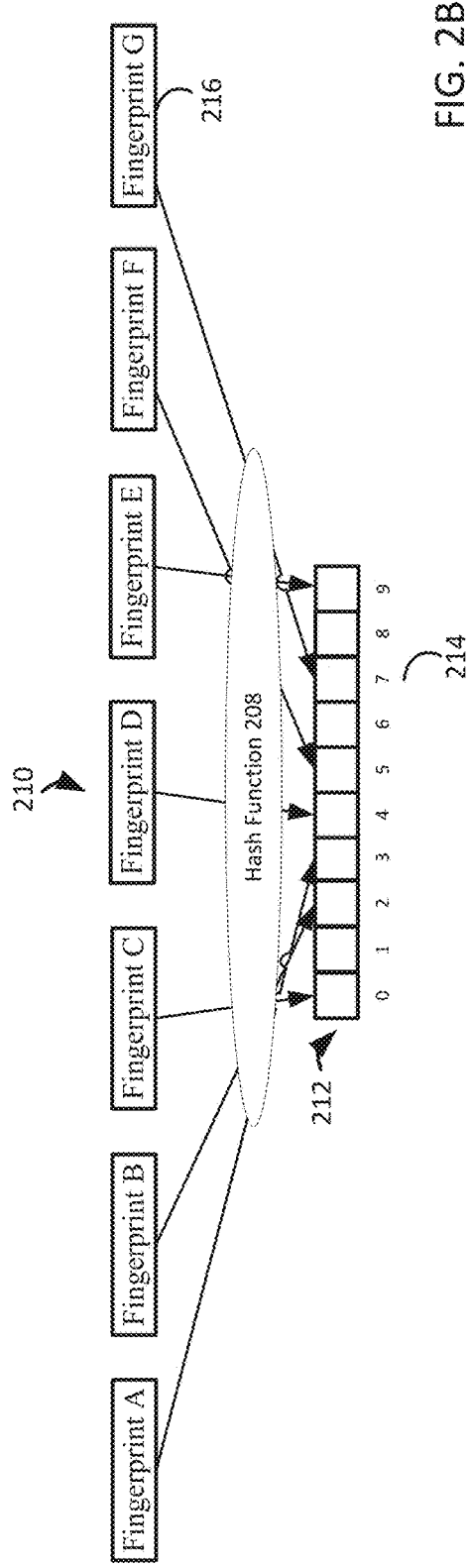
Figure 3:
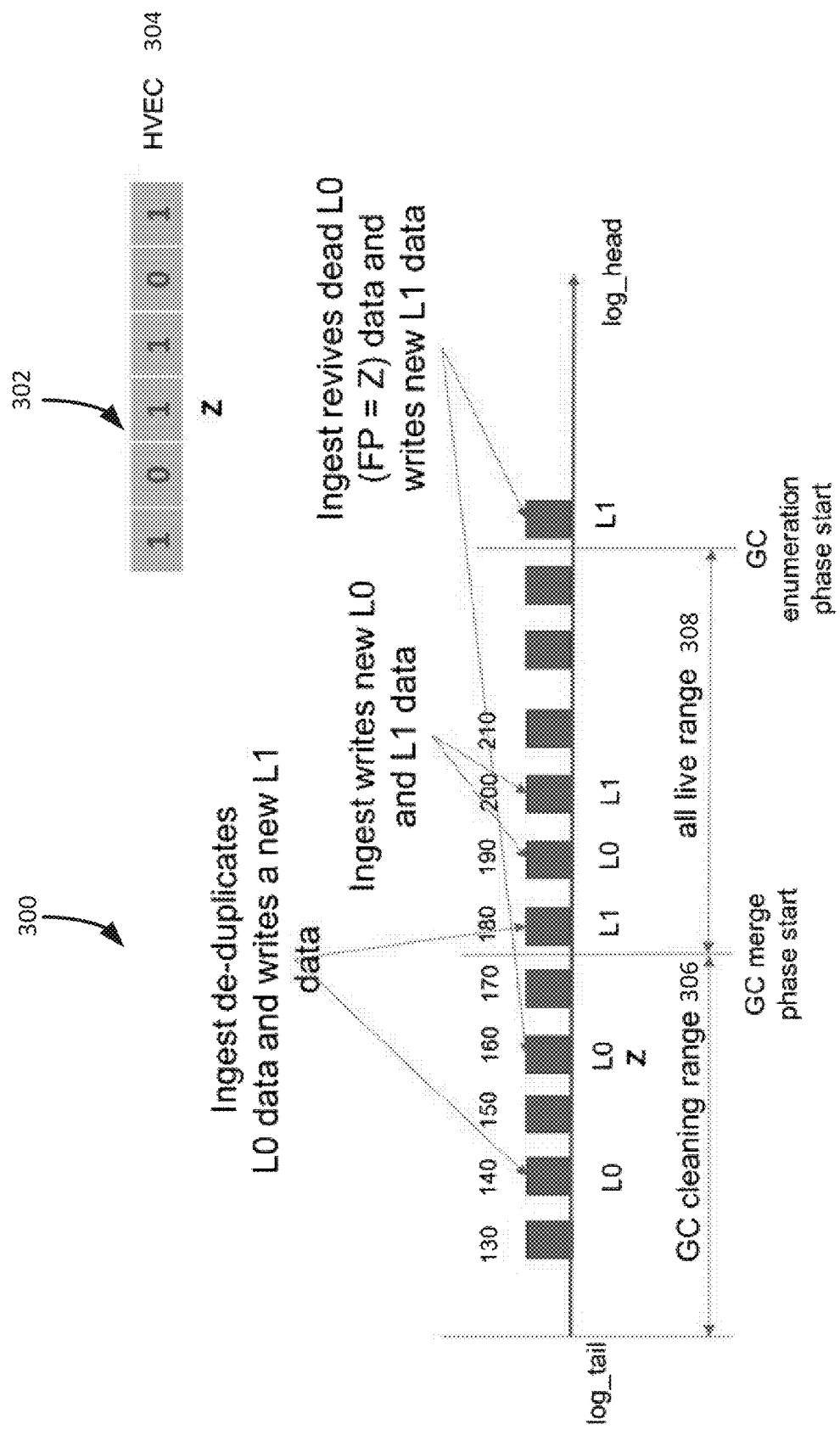
FIG. 3 illustrates a block diagram of containers for resumable garbage collection, under an embodiment.
Figure 4:
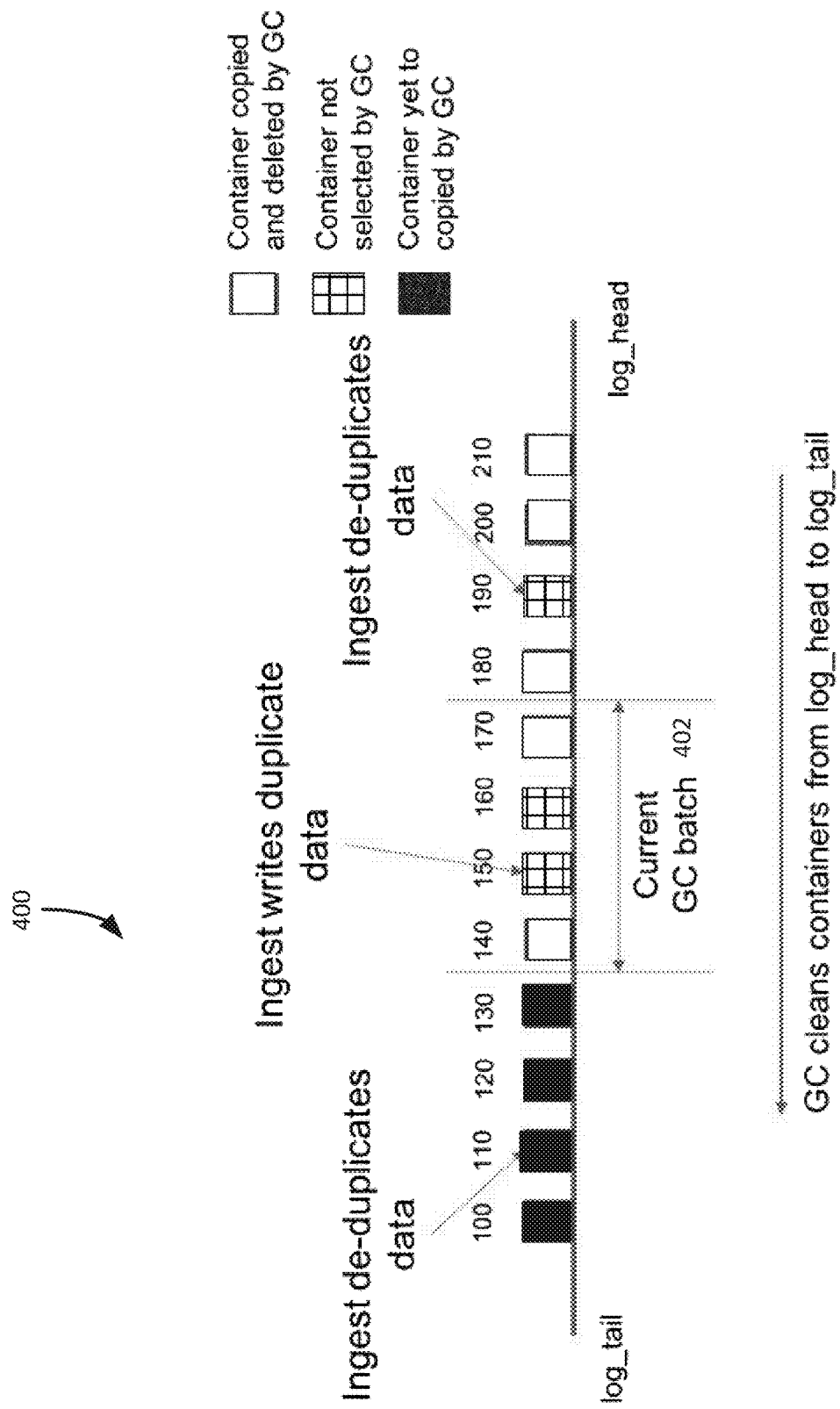
FIG. 4 illustrates another block diagram of containers for resumable garbage collection, under an embodiment.

The possibility of such a collision between the hashes of two different fingerprints depends upon a system's load factor, the hash function used, and the size of the hash vector. A collision of hashes for different fingerprints can even occur for a new file segment when using a perfect hash function for the other file segments. A perfect hash function is a collision-free hash function that maps a key set of size N to a vector of size M, where M>N. A perfect hash function for a known key set is created by applying different hash functions that map the known key set to the vector of the specified size until a hash function is identified that maps the known key set to the vector without any collisions. FIG. 2B depicts a perfect hash function 208 that maps 7 fingerprints 210 to the 10-bit hash vector 212 without any collisions. Creating the perfect hash function 208 may require several iterations to map 7 keys to 10 positions without any collisions. As the value of M increases, the time required to create a perfect hash vector reduces because more positions in the hash vector can accommodate the N keys, but more space is required for the increased size of the hash vector. The load factor used to implement a perfect hash vector is the ratio of N to M, such as a load factor of 7/10 means that for every N=7 keys in the system, the perfect hash function reserves M=10 bits for the perfect hash vector. For example, if the garbage collector identified 70 million file segments in a computer system, and the predetermined load factor is 7 keys to 10 bits, then the garbage collector would allocate a 100 million-bit hash vector, and may also allocate 100 million bits for the perfect hash vector. However, since not all of the file segments in the computer system are live, the actual load factor is usually smaller than the initial load factor. Since the perfect hash function maps only the known file segments to the perfect hash vector without any collisions, the perfect hash function may map a new file segment to the perfect hash vector with a collision.

Consequently, when the garbage collector processes the container 130 508 in the cleaning range 510, and reviews the bit set to 1 in the hash vector that corresponds to the hash for the new fingerprint D and the old fingerprint X, the garbage collector will process the dead file segment X as a live segment. This collision of bits for the hash of the new fingerprint D and the old fingerprint X may result in the garbage collector not selecting the container 130 508 for cleaning when the container 130 508 should have been selected for cleaning, or result in the garbage collector creating a new container for the live file segments of the container 130 508 and copying the dead file segment X to the new container. Although this example describes the writing of a single object during the suspension of the garbage collection resulting in a single cleaning inefficiency, the writing of many objects during the suspension of the garbage collection can result in many cleaning inefficiencies.

Therefore, when the garbage collection suspension ends, the garbage collector needs to reinitialize the cleaning process at the beginning phase to maintain data consistency because the garbage collector does not correctly process the writing of objects that occurred during the suspension of garbage collection. Consequently, the garbage collector may lose much of the overhead work that was done during the phases executed prior to the suspension of garbage collection.

Embodiments herein provide a resumable garbage collector. A system generates a first data structure based on unique identifiers of objects in object storages, wherein positions in the first data structure correspond to hashes of the unique identifiers of the objects in the object storages. The system sets indicators in positions in the first data structure which correspond to hashes of unique identifiers of active objects in the object storages. When garbage collection is suspended, the system stores suspension information, including the first data structure, to persistent storage. The system sets indicators in positions in a second data structure which correspond to hashes of unique identifiers of data objects that are deduplicated to the object storages while garbage collection is suspended. When garbage collection is resumed, the system retrieves the suspension information from the persistent storage. The system sets indicators in positions in the first data structure which correspond to hashes of unique identifiers of data objects that correspond to indicators set in the positions of the second data structure. The system copies active objects from a first object storage to a second object storage if the number of active objects in the first object storage does not satisfy a threshold. The system resets the indicators in positions in the first data structure which correspond to hashes of unique identifiers of active objects copied to the second object storage.

For example, a garbage collector stores an index of fingerprints for the file segments in the backup files to a backup server, and then applies a perfect hash function to the fingerprints to generate a perfect hash vector. The garbage collector conducts a level-by-level review of the metadata segments for containers in a cleaning range to identify their L0 and Lp references, which include the fingerprints of the live L0 data segments and the live Lp metadata segments in the containers 130-170, and then sets the bits in the perfect hash vector that correspond to the perfect hashes created by applying the perfect hash function to the fingerprints of the live L0 data segments in the containers 130-170. The garbage collector receives a garbage collection suspension command, suspends data-movement to quiesce I/O operations to containers, persists the perfect hash function, the perfect hash vector, and the identifier of container 170 to the backup server, allocates a bloom filter, disables Lp metadata deduplication, switches ingest notifications to use the bloom filter, and resumes data-movement. The garbage collector sets the bits in the bloom filter that correspond to the bloom filter hashes created by applying the bloom filter hash functions to the fingerprints A and B of the L0 data file segments A and B deduplicated to the containers 130-170 in the cleaning range while garbage collection is suspended. The garbage collector receives a garbage collection resumption command, suspends data-movement to quiesce I/O operations to containers, retrieves the perfect hash function, the perfect hash vector, and the identifier of container 170 from the backup server, enables Lp metadata deduplication, switches ingest notifications to use the perfect hash vector, and then resumes data-movement to allow ingest to continue writing to containers.

The garbage collector reviews the metadata segments in the new containers written during the suspension of the garbage collection to identify their L0 data segments references, which include the fingerprints A-F of the data file segments A-F in the containers 130-210, applies the bloom filter hash functions to the fingerprints A-F to generate the bloom filter hashes of the fingerprints A-F, and compares the bloom filter hashes of the fingerprints A-F to their corresponding bits in the bloom filter. Since the bits 1 and 3 that are set to 1 in the bloom filter correspond to the bits for the revived file segment A, the garbage collector applies the perfect hash function to the corresponding fingerprint A to generate the perfect hash of the fingerprint A, and sets the bit to 1 in the perfect hash vector that corresponds to the perfect hash of the fingerprint A. Since the bits 2 and 7 that are set to 0 in the bloom filter correspond to the bits for the new file segment D, the garbage collector does not set the bit to 1 in the perfect hash vector that corresponds to the hash of the fingerprint D, such that no unintended revival of the dead segment X occurs that would have occurred due to the collision of hashes for the fingerprints D and X.

The garbage collector identifies the fingerprints for the L0 data segments in the container 140, applies the perfect hash function to these identified fingerprints to create perfect hashes, and then checks the bits in the perfect hash vector that correspond to these perfect hashes. If the bit for a fingerprint's perfect hash is set to 1 in the perfect hash vector, then the bit corresponds to a fingerprint of a live object. Since 40% of the file segments in the container 140 are dead segments, the garbage collector creates the new container 250, and then copies the live file segments, including the dead file segment A that was revived during the suspension of garbage cleaning, in the container 140 into the new container 250, thereby retaining the revival of the dead file segment A. The garbage collector resets the bits in the perfect hash vector that correspond to the perfect hashes for the fingerprints of the file segments in the new container 250, and then deletes the container 140, which is a cleaning or a garbage collection that reclaims unused storage space for subsequent reuse.

Figure 6:
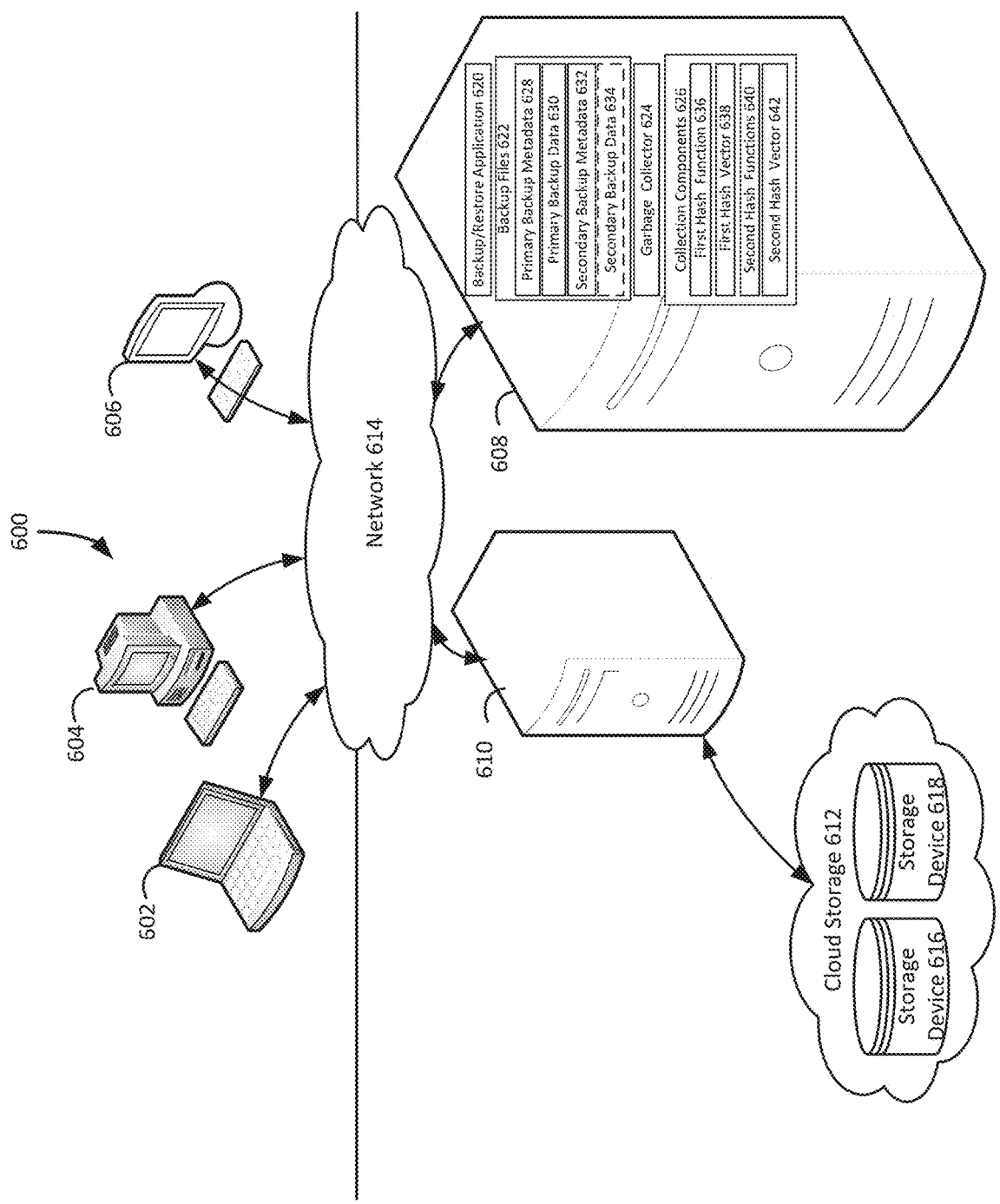
FIG. 6 illustrates a block diagram of an example system for resumable garbage collection, under an embodiment.

FIG. 6 illustrates a block diagram of a system that implements resumable garbage collection, under an embodiment. As shown in FIG. 6, system 600 may illustrate a cloud computing environment in which data, applications, services, and other resources are stored and delivered through shared data-centers and appear as a single point of access for the users. The system 600 may also represent any other type of distributed computer network environment in which servers control the storage and distribution of resources and services for different client users.

In an embodiment, the system 600 represents a cloud computing system that includes a first client 602, a second client 604, and a third client 606; and a first server 608, a second server 610, and a cloud storage 612 that may be provided by a hosting company. Although FIG. 6 depicts the first client 602 as a laptop computer 602, the second client 604 as a personal computer 604, and the third client 606 as an Apple® Macintosh computer 606, each of the clients 602-606 may be any type of computer, such as a server. The clients 602-606 and the servers 608-610 communicate via a network 614. The cloud storage 612 includes a first storage device 616 and a second storage device 618.

The first server 608 includes a backup/restore application 620, backup files 622, a garbage collector 624, and collection components 626. The backup files 622 include primary backup metadata 628, primary backup data 630, and secondary backup metadata 632, and sometimes include secondary backup data 634. The collection components 630 include a first hash function 636, a first hash vector 638, second hash functions 640, and a second hash vector 642. A hash function generally refers to an expression that can be used to map data of arbitrary size to data of a fixed size. Each of the components 620-642 may be combined into larger components and/or divided into smaller components. The first hash function 636 may be the perfect hash function 636, and the first hash vector 638 may be the perfect hash vector 638.

The second hash vector 642 may be a bloom filter 642, such that the second hash functions 640 may be bloom filter hash functions 640. A Bloom filter is a space-efficient probabilistic data structure that can be used to test whether an item is a member of a set of items. An empty Bloom filter is a bit array of m bits that are all equal to 0. The bit array uses k different hash functions, each of which hashes one item to one of the m bits in the bit array. When an item is added to a set of items, each of the k hash functions is applied to the item to generate k hash values, and the bits that correspond to the k hash values are set to 1 in the bit array. Therefore, when n items are added to a set of items, the k hash functions are applied to each of the n items to generate n*k hash values, and the corresponding n*k bits are set in the array, with relatively few of the hash functions generating the same hash values for different items. After all of the additions of items to the set of items, the proportion of bits that are still equal to zero may be calculated as being equal to (m−(n*k))/m, or 1−(n*k/m).

Therefore, if any item that is not in the set of items is hashed by any of the k hash functions, the likelihood that the resulting hash value corresponds to a bit that is already set in the array equals 1−(n*k/m). To test whether an item is in the set of items, the k hash functions are applied to the tested item to generate k hash values, and the bits that correspond to these k hash values are tested in the bit array. If any of these tested bits is 0, the item is definitely not in the set of items, because all of the tested bits would have been set to 1 if the item had been added to the set of items. If all of the tested bits are 1, then either the item is in the set of items, or these tested bits have by chance been set to 1 during the insertion of other items, which would be a false positive match. Since false positive matches are possible and false negatives matches are not, a test of whether an item is in a set of items results in either the conclusion that the item is possibly in the set of items or the conclusion that the item is definitely not in the set of items. The more items that are added to the set of items, the larger the probability of false positive matches.

FIG. 6 depicts the system 600 with three clients 602-606, two servers 608-610, one cloud storage 612, one network 614, two storage devices 616-618, one backup/restore application 620, one set of backup files 622, one garbage collector 624, and one set of collection components 630. However, the system 600 may include any number of clients 602-606, any number of servers 608-610, any number of cloud storages 612, any number of networks 614, any number of storage devices 616-618, any number of backup/restore applications 620, any number of sets of backup files 622, any number of garbage collectors 624, and any number of sets of collection components 630. The clients 602-606 and the servers 608-610 may each be substantially similar to the system 800 depicted in FIG. 8 and described below in reference to FIG. 8.

FIG. 6 depicts the backup/restore application 620 residing completely on the first server 608, but the backup/restore application 620 may reside completely on any of the clients 602-606, completely on another server that is not depicted in FIG. 6, or in any combination of partially on the first server 608, partially on the clients 602-606, and partially on the other server. The backup/restore application 620 may provide a plug-in to any of the clients 602-606 and/or the first server 608 that enables any of the clients 602-606 and/or the first servers 608 to execute the commands to back up and restore a data object. Even though the following paragraphs describe EMC Corporation's NetWorker® backup/restore application and EMC Corporation's Avamar® backup/restore application as examples of the backup/restore application 620, the backup/restore application 620 may be any other backup/restore application which provides the backup/restore functionalities described in the Background section.

The backup/restore application 620 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 620 may also be implemented as a NetWorker® Module For Microsoft Applications, which, as stated above, may reside completely on of the first server 608, completely on any of the clients 602-606, completely on another server that is not depicted in FIG. 6, or in any combination of partially on the first server 608, partially on the clients 602-606, and partially on the other server.

The backup/restore application 620 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup data sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The first server 608, which may be referred to as the backup server 608, may be configured as an EMC Corporation's Data Domain server. The Data Domain operating system delivers scalable, high-speed, and cloud-enabled protection storage for backup, archive, and disaster recovery. Data Domain employs variable-length deduplication to minimize disk requirements, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

The second server 610, which may be referred to as a cloud storage gateway 610, may be a network appliance or server which resides at a customer's premises, and can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CIFS). A file system interface may be an API (application programming interface) through which a utility or user program requests the storing and retrieving of data. The cloud storage gateway 610 can also serve as an intermediary to multiple cloud storage providers. The cloud storage 612 may be a Google® cloud platform, an Amazon Web Services® cloud platform, a Microsoft® Azure cloud platform, or any other cloud platform.

The resumable garbage collection can begin by generating a first data structure based on unique identifiers of objects in object storages, wherein positions in the first data structure correspond to hashes of the unique identifiers of the objects in the object storages. Generating the first data structure can include storing an index of unique identifiers of the objects in the object storages.

A data structure generally refers to an information organization and storage format that enables efficient access and modification. A unique identifier generally refers to a sequence of characters used to refer to an entity as being the only one of its kind. An object generally refers to a group of information. An object storage generally refers to a portion of any data retention device that retains a group of information. A position generally refers to a particular place where something is located. A hash generally refers to a value returned by an expression that can be used to map data of arbitrary size to data of a fixed size. An index generally refers to be an ordered list of elements, with references to the locations where the elements are stored.

The merge phase includes storing an index of unique identifiers of the objects in the object storages. For example, during the merge phase the garbage collector 624 stores an index of fingerprints for the file segments in the backup files 622 to a disk on the backup server 608. If the file segments in the backup files 622 include the primary backup metadata 628 and the primary backup data 630, then the garbage collection may be referred to as a cleaning of the active tier. If the file segments in the backup files 622 include the secondary backup metadata 632 and the secondary backup data 634, then the garbage collection may be referred to as a cleaning of the cloud tier. Cleaning of the cloud tier may require the backup server 608 to retrieve the secondary backup data 634 from the cloud storage 612 via the gateway server 610, and to return the secondary backup data 634 to the cloud storage 612 via the gateway server 610.

After storing the index of unique identifiers of the objects in the object storages, the analysis phase is executed, which includes generating a first data structure based on unique identifiers of objects in object storages, wherein positions in the first data structure correspond to hashes of the unique identifiers of the objects in the object storages. For example, the garbage collector 624 applies the perfect hash function 636 to the fingerprints 210 to generate the perfect hash vector 638.

Following the generation of the first data structure, the enumeration phase is executed, which includes setting indicators in positions in the first data structure which correspond to hashes of unique identifiers of active objects in the object storages. Setting the indicators in the positions in the first data structure can include identifying the unique identifiers of the active objects by reviewing metadata associated with the objects in the object storages, and then generating hashes of the unique identifiers of the active objects.

An indicator generally refers to a thing that provides specific information about the state or condition of something in particular. An active object generally refers to a group of information that is used by at least one program in a computer system. Metadata generally refers to a set of information that describes other information.

Figure 5A:
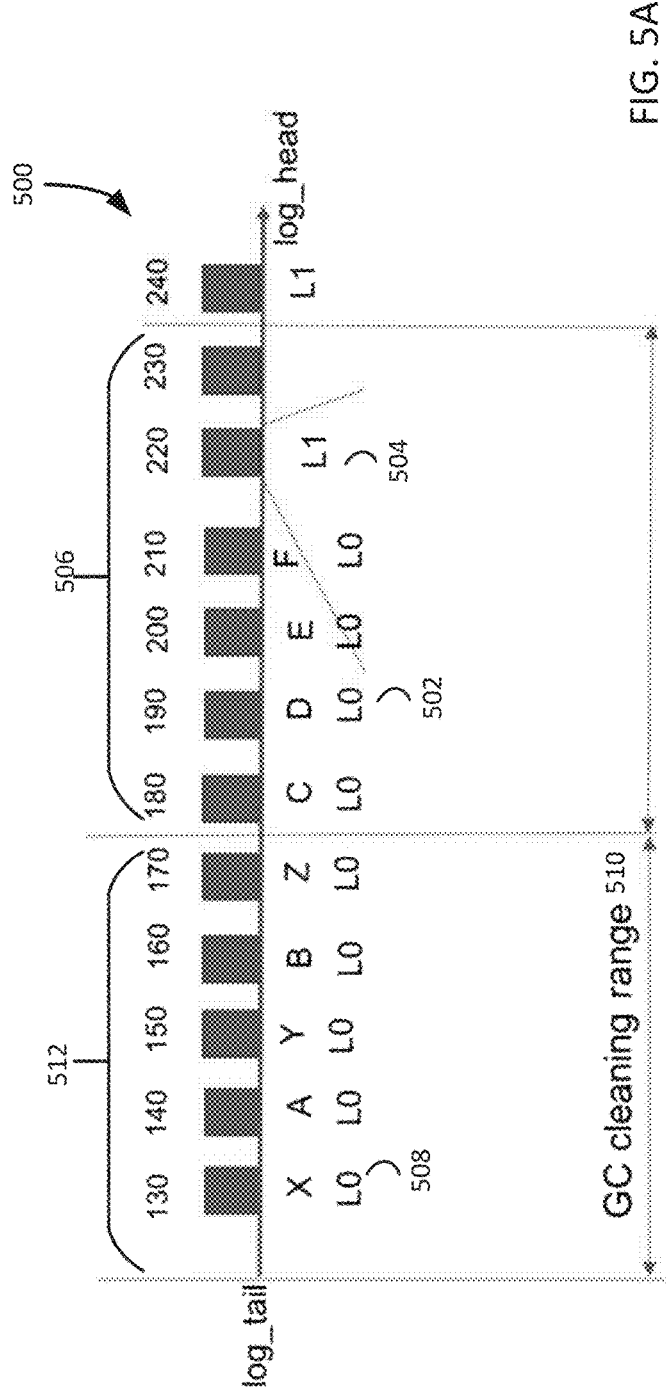
FIGS. 5 A-B illustrate yet another block diagram of containers for resumable garbage collection, under an embodiment.

The enumeration phase begins by identifying the unique identifiers of the active objects by reviewing metadata associated with the objects in the object storages. For example, the garbage collector 624 conducts a level-by-level review of the metadata segments for the containers 130-170 512 in the cleaning range 510 to identify their L0 and Lp references, which include the fingerprints of the live L0 data segments 512 in the containers 130-170, as depicted by FIG. 5A. The enumeration phase continues by generating hashes of the unique identifiers of the active objects, and then setting indicators in positions in the first data structure which correspond to the hashes of the unique identifiers of the active objects in the object storages. For example, the garbage collector 624 sets the bits in the perfect hash vector 638 that correspond to the perfect hashes created by applying the perfect hash function 636 to the fingerprints of the live L0 data segments in the containers 130-170 512.

Having set indicators in positions in the first data structure, the selection phase is executed, which can be followed by the execution of the copy phase, as described below. At any point in time during the execution of the selection phase or the copy phase, garbage collection may be suspended. If garbage collection is suspended during the selection phase, the garbage collector 624 can execute the selection phase again after garbage collection resumes. The garbage collector 624 persists the identifiers of containers selected for cleaning at the end of the selection phase to a file on a disk. Consequently, if garbage collection is suspended during the copy phase, the garbage collector 624 can restore the identifiers of the containers selected for cleaning from the file stored on the disk and execute the copy phase again after garbage collection resumes, without needing to re-execute the selection phase again.

If garbage collection is suspended during the enumeration phase, the garbage collector 624 may execute the enumeration phase again after garbage collection resumes. The garbage collector 624 may set an indicator for each object that has been enumerated, so that if garbage collection is suspended during the enumeration phase, upon resumption of garbage collection the garbage collector 624 can verify whether an object has already been enumerated by checking whether the object's indicator is set before enumerating the object. Consequently, the garbage collector 624 only has to enumerate each object once. For example, if the garbage collector 624 enumerates the file 60, and sets the bit for the file 60 before garbage collection is suspended, once garbage collection resumes the garbage collector 624 executes the enumeration phase again, verifies that the file 60's enumeration bit is set, and then bypasses the file 60 for enumeration.

When garbage collection is suspended, suspension information, including the first data structure, is stored to persistent storage. Storing the suspension information may include any of suspending object storage writes, allocating a second data structure, disabling de-duplication of metadata writes, assigning deduplicated data write notifications to the second data structure, and resuming the object storage writes. Suspension information may also include any of a hash function used to create the first data structure, and an identifier of a most recently persisted object storage.

For example, the garbage collector 624 receives a garbage collection suspension command from an overloaded host system, suspends data-movement to quiesce I/O operations to containers, and then persists the perfect hash function 636, the perfect hash vector 638, and the identifier of container 170 to a disk on the backup server 608. In this example the most recently persisted object storage is the container 170 because the container 170 is the highest numbered container in the cleaning range 510. However, if the garbage collector 624 cleaned the container 160 by creating a new container 180 and copying the live data segments from the container 160 to the new container 180, then the new container 180 would be the most recently persisted object storage. Continuing the example, the garbage collector 624 allocates the bloom filter 642 in-memory to keep track of de-duplicated segments written to the containers 130-170 512, disables Lp metadata deduplication, switches ingest notifications to use the bloom filter 642, and resumes data-movement to allow ingest to continue writing to containers. The garbage collector 624 disables Lp metadata deduplication so that when ingest writes to containers during the suspension of garbage collection, ingest will write the Lp metadata to new containers, such that upon resumption of garbage collection, the garbage collector 624 only has to review the new containers to identify any new Lp metadata segments.

Garbage collection generally refers to the process of selecting a container for cleaning or the process of copying live segments from a selected container to a newly created container. Suspension information generally refers to data describing the context in which something is temporarily prevented from occurring. Persistent storage generally refers to a portion of any data retention device that indefinitely retains information. An object storage write generally refers to the recording of information to a portion of any data retention device that retains a group of information. A metadata write generally refers to the recording of a set of information that describes other information. A deduplicated data write notification generally refers to a message about the recording of information for which redundant copies of repeating information have been eliminated. An identifier generally refers to a sequence of characters used to refer to an element. A most recently persisted object storage generally refers to a portion of any data retention device that retains a group of information and that was recorded as existing at a past period of time comparatively close to the present.

After the generation of the second data structure, indicators are set in positions in the second data structure which correspond to hashes of unique identifiers of data objects that are deduplicated to object storages while garbage collection was suspended. Setting the indicators in the positions in the second data structure may include identifying the unique identifiers of the data objects that are deduplicated to object storages while garbage collection was suspended, and then generating hashes of the unique identifiers of the data objects. A data object generally refers to a group of information.

During the suspension of garbage collection, all de-duplicated segments are populated in the bloom filter 642. After generating a bloom filter, the garbage collector 624 sets the bits in the bloom filter that correspond to the bloom filter hashes created by applying the bloom filter hash functions to the fingerprints of the revived L0 data file segments in the containers in the cleaning range. For example, the garbage collector 624 sets the bits in the bloom filter 514 that correspond to the bloom filter hashes created by applying the bloom filter hash functions 640 to the fingerprints A and B of the revived L0 data file segments A and B in the containers 130-170 in the cleaning range 510, as depicted by FIG. 5A. Since the fingerprints C, D, E, and F are for the non-deduplicated file segments C, D, E, and F that are stored in the containers 180-210 that are not in the cleaning range 510, the garbage collector 624 does not set the bits in the bloom filter 514 that correspond to the bloom filter hashes created by applying the bloom filter hash functions 640 to the fingerprints C, D, E, and F. Since Lp metadata deduplication is disabled, new data segments written during the suspension of garbage collection are written to new containers that are not in the cleaning range, while revival of dead data segments written during the suspension of garbage collection are written to the containers that are in the cleaning range.

The garbage collector 624 records the revival of dead data segments in the bloom filter 514 for many reasons. Garbage collection may be suspended because the host system's memory is insufficient to store the perfect hash function 636 and the perfect hash vector 638. In contrast to the relatively large perfect hash vector 638 that was generated by applying the relatively large perfect hash function 636 to the relatively large set of all of the fingerprints of all segments in all containers, the garbage collector 624 generates the relatively small bloom filter 642 by applying the relatively small bloom filer hash functions 640 to the relatively small set of fingerprints of the data objects deduplicated to the cleaning range 510 during the suspension of garbage collection. For example, if the containers store 70 million segments that have 70 million fingerprints, then the perfect hash vector 638, with a load factor of 7 keys to 10 bits, has a size of 100 million bits and the first hash function 636 uses 100 million bits of memory to execute. In contrast, if only 70 segments were created during the suspension of garbage collection, then the relatively small bloom filter 642 may has a size of only 700 bits, and the bloom filter hash functions 640 may use only 700 bits of memory to execute. Consequently, the garbage collector uses the bloom filter 514 to store the fingerprints of deduplicated file segments because a bloom filter is a space efficient data structure that minimizes the probabilities for collisions between fingerprints of revived data segments.

Garbage collection may be resumed for a variety of reasons. A system administrator may resume garbage collection. If a garbage collector scheduled to clean local containers suspends the garbage collection of remote containers due to the higher priority for the garbage collection of local containers, when the garbage collector finishes cleaning the local container, the garbage collector that cleaned local containers may resume the garbage collection of remote containers. If a commonly occurring cloud disconnect suspended cloud garbage collection, the cloud garbage collection may resume when the cloud reconnects. If a heavily loaded system suspended garbage collection, the system may resume garbage collection when the system is not heavily loaded.

When garbage collection is resumed, the suspension information is retrieved from the persistent storage. Retrieving the suspension information can include any of suspending the object storage writes, enabling the de-duplication of the metadata writes, assigning deduplicated data write notifications to the first data structure, and resuming the object storage writes. For example, the garbage collector 624 receives a garbage collection resumption command from a host system that is no longer overloaded, suspends data-movement to quiesce I/O operations to containers, and then retrieves the perfect hash function 636, the perfect hash vector 638, and the identifier of container 170 from the disk on the backup server 608. The garbage collector 624 also enables Lp metadata deduplication, switches ingest notifications to use the perfect hash vector 638, and then resumes data-movement to allow ingest to continue writing to containers.

Figure 5B:
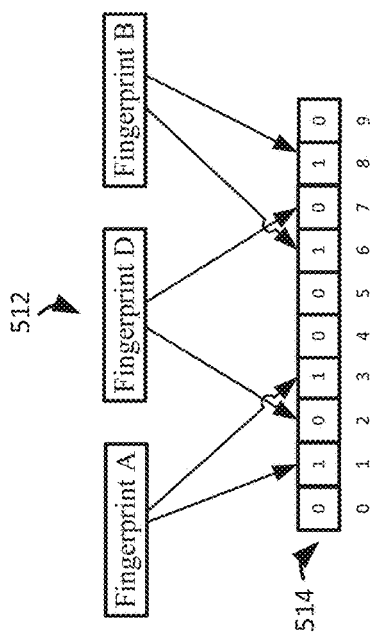

Using the suspension information, indicators are set in positions in the first data structure which correspond to hashes of unique identifiers of data objects that correspond to indicators set in the positions of the second data structure. To set the bits in the perfect hash vector, the garbage collector 624 reviews the metadata segments written to new containers during the suspension of garbage collection to identify their L0 data segments references, applies the bloom filter's hash functions to the fingerprints for the L0 data segments to generate the bloom filter's hashes of these fingerprints, and then compares the bloom filer's hashes of these fingerprints to their corresponding bits in the bloom filter. For example, the garbage collector 624 reviews the metadata segments in the new containers 506, which are numbered higher than the most recently persisted container 170, to identify their L0 data segments references, which include the fingerprints A, B, C, D, E, and F of the L0 data file segments A, B, C, D, E, and F in the containers 130-210, and applies the bloom filer's hash functions 640 to the fingerprints A, B, C, D, E, and F to generate the bloom filer's hashes of the fingerprints A, B, C, D, E, and F, as depicted by FIG. 5A. Then the garbage collector 624 compares the bloom filer's hashes of the fingerprints A, B, C, D, E, and F to their corresponding bits in the bloom filter 514, as depicted by FIG. 5B.

For example, when the garbage collector 624 compares the bloom filer's hashes of the fingerprint A to their corresponding bits 1 and 3 in the bloom filter 514, the bits 1 and 3 are set to 1, which indicates that the file segment A, which corresponds to the fingerprint A, is a dead file segment that was revived during suspension of garbage cleaning. In another example, when the garbage collector 624 compares the bloom filer's hashes of the fingerprint B to their corresponding bits 6 and 8 in the bloom filter 514, the bits 6 and 8 are set to 1, which indicates that the file segment B, which corresponds to the fingerprint B, is a dead file segment that was revived during suspension of garbage cleaning. In yet another example, when the garbage collector 624 compares the bloom filer's hashes of the fingerprint D to their corresponding bits 2 and 7 in the bloom filter 514, the bits 2 and 7 are set to 0, which indicates that the file segment D, which corresponds to the fingerprint D, is not a dead file segment that was revived during suspension of garbage cleaning. Similarly, garbage collector 624 determines that the file segments C, E, and F are not dead file segments that were revived during suspension of garbage cleaning.

Since a group of bits set to 1 in the bloom filter 514 corresponds to a revived file segment in the containers 130-170 512, the garbage collector 624 generates the perfect hash of the corresponding fingerprint by applying the perfect hash function 636 to a fingerprint that hashed to a group of set bits in the bloom filter 514, and then sets the bit to 1 in the perfect hash vector 638 that corresponds to the perfect hash of the corresponding fingerprint. For each group of indicators that is set in the second data structure, the group of indicators signifies that the corresponding data object was deduplicated to an object storage while garbage collection was suspended. For example, the bits 1 and 3 are set to 1 in the bloom filter 514, and these bits correspond to the bloom filter's hashes of the fingerprint A, which indicates that the corresponding L0 data file segment A was written to the cleaning range 510, which includes the container 140 that stores the revived data file segment A. Therefore, since each group of indicators that is set in the second data structure corresponds to an indicator in the first data structure, the garbage collector 624 applies the first hash function to the corresponding unique identifier to generate the hash of the unique identifier, and then sets the indicator in the first data structure that corresponds to the hash of the unique identifier. For example, since the bits 1 and 3 that are set to 1 in the bloom filter 514 correspond to the bits for the revived file segment A, the garbage collector 624 applies the perfect hash function 636 to the corresponding fingerprint A to generate the perfect hash of the fingerprint A, and sets the bit to 1 in the perfect hash vector 636 that corresponds to the hash of the fingerprint A, thereby retaining the revival of the dead file segment A that occurred during the suspension of garbage collection. Similarly, the garbage collector 624 also applies the perfect hash function 636 to the fingerprint B to generate the perfect hash of the fingerprint B and sets the bit to 1 in the perfect hash vector 638 that correspond to the hash of the fingerprint B, thereby retaining the revival of the dead file segment B that occurred during the suspension of garbage collection.

Since the bits 2 and 7 that are set to 0 in the bloom filter 514 correspond to the bits for the new file segment D, the garbage collector 624 does not apply the perfect hash function 636 to the corresponding fingerprint D to generate the perfect hash of the fingerprint D. Since the garbage collector 624 does not set the bit to 1 in the perfect hash vector 636 that corresponds to the hash of the fingerprint D, no unintended revival of the dead segment X occurs that would have occurred due to the collision of perfect hashes for the fingerprints D and X.

After setting indicators in the first data structure, the selection phase is executed, which includes determining whether a number of active objects in a first object storage satisfies a threshold. A number generally refers to an arithmetical value, expressed by a word, symbol, or figure, representing a particular quantity, and used in counting and making calculations. A threshold generally refers to the magnitude that must be satisfied for a certain reaction, phenomenon, result, or condition to occur or be manifested.

For example, the garbage collector 624 identifies the fingerprints for the L0 data segments in the container 140, applies the perfect hash function 636 to these identified fingerprints to create hashes, and then checks the bits in the perfect hash vector 638 that correspond to these hashes. If the bit for a fingerprint's hash is set to 1 in the perfect hash vector 638, then the bit corresponds to a fingerprint of a live object. If the bit for a fingerprint's hash is not set to 1 in the perfect hash vector 638, then the bit corresponds to a fingerprint of a dead object.

Continuing the example, the garbage collector 624 determines that only 19.5% of the file segments in the container 140 are dead file segments, which satisfies the threshold of 20% dead segments in a container, and bypasses selection of the container 140 for cleaning, therefore retaining the container 140 as it is. If the garbage collector 624 did not set the bit in the perfect hash vector 638 corresponding to the dead file segment A that was revived during the suspension of garbage collection, then the garbage collector 624 may have determined that 21% of the file segments in the container 140 are dead file segments. This erroneous percentage of dead segments would have not have satisfied the threshold of 20% dead segments in a container, which would have resulted in needlessly cleaning the container 140 and failing to retain the dead file segment A that was revived during the suspension of garbage collection. Further to this example, the garbage collector 624 resets the bits in the perfect hash vector 638 that correspond to the perfect hashes of the fingerprints for the file segments in the container 140, which enables the subsequent processing of containers to not require retention of these file segments, which may be referenced as duplicates in other containers. Although this example describes the number of active objects as a percentage of dead file segments, any relative or absolute number of the active objects may be used.

If the garbage collector 624 had set the bit in the perfect hash vector 638 corresponding to the new file segment D that was written during the suspension of garbage collection, and the hash for the new fingerprint D was the same as the hash for the old fingerprint X of the old file segment X that is a dead segment which is stored by the container 130, then the garbage collector 624 may have determined that only 19.5% of the file segments in the container 130 are dead file segments. This erroneous percentage of dead segments would have satisfied the threshold of 20% dead segments in a container, which would have resulted in erroneously bypassing the cleaning of the container 130.

In an alternative example, the garbage collector 624 determines that 40% of the file segments in the container 140 are dead file segments, which does not satisfy the threshold of 20% dead segments in a container, and selects the container 140 for cleaning. The garbage collector 624 may evaluate multiple containers in the cleaning range 510 to select any combination of these containers in the cleaning range 510 for cleaning.

Following a determination that the number of active objects in the first object storage does not satisfy a threshold, the copy phase is executed, which includes copying active objects from the first object storage to a second object storage, and resetting the indicators in positions in the first data structure which correspond to hashes of unique identifiers of active objects copied to the second object storage. Continuing the alternative example, the garbage collector 624 creates the new container 250, and copies the live file segments, including the dead file segment A that was revived during the suspension of garbage cleaning, in the container 140 into the new container 250, thereby retaining the revival of the dead file segment A. Then the garbage collector 624 resets the bits in the perfect hash vector 638 that correspond to the perfect hashes for the fingerprints of the file segments in the new container 250, which enables the subsequent processing of containers to not require retention of these file segments. Completing the copy phase for the alternative example, the garbage collector 624 deletes the container 140, which is a cleaning that reclaims unused storage space for subsequent reuse.

If the garbage collector 624 did not set the bit in the perfect hash vector 638 corresponding to the dead file segment A that was revived during the suspension of garbage collection, then the garbage collector 624 would have excluded copying the revived file segment A while copying the live file segments in the container 140 into the new container 250, thereby failing to retain the revival of the dead file segment A. If the garbage collector 624 had set the bit in the perfect hash vector 638 corresponding to the new file segment D that was written during the suspension of garbage collection, and the hash for the new fingerprint D was the same as the hash for the old fingerprint X of the old file segment X that is a dead segment which is stored by the container 130, then the garbage collector 624 may have copied the live file segments, including the dead file segment X, in the container 130 into the new container 260, thereby erroneously reviving the dead file segment X. Since the garbage collector 624 can resume after garbage collection suspensions, the overall garbage time and the use of corresponding system resources is reduced.

Figure 7:
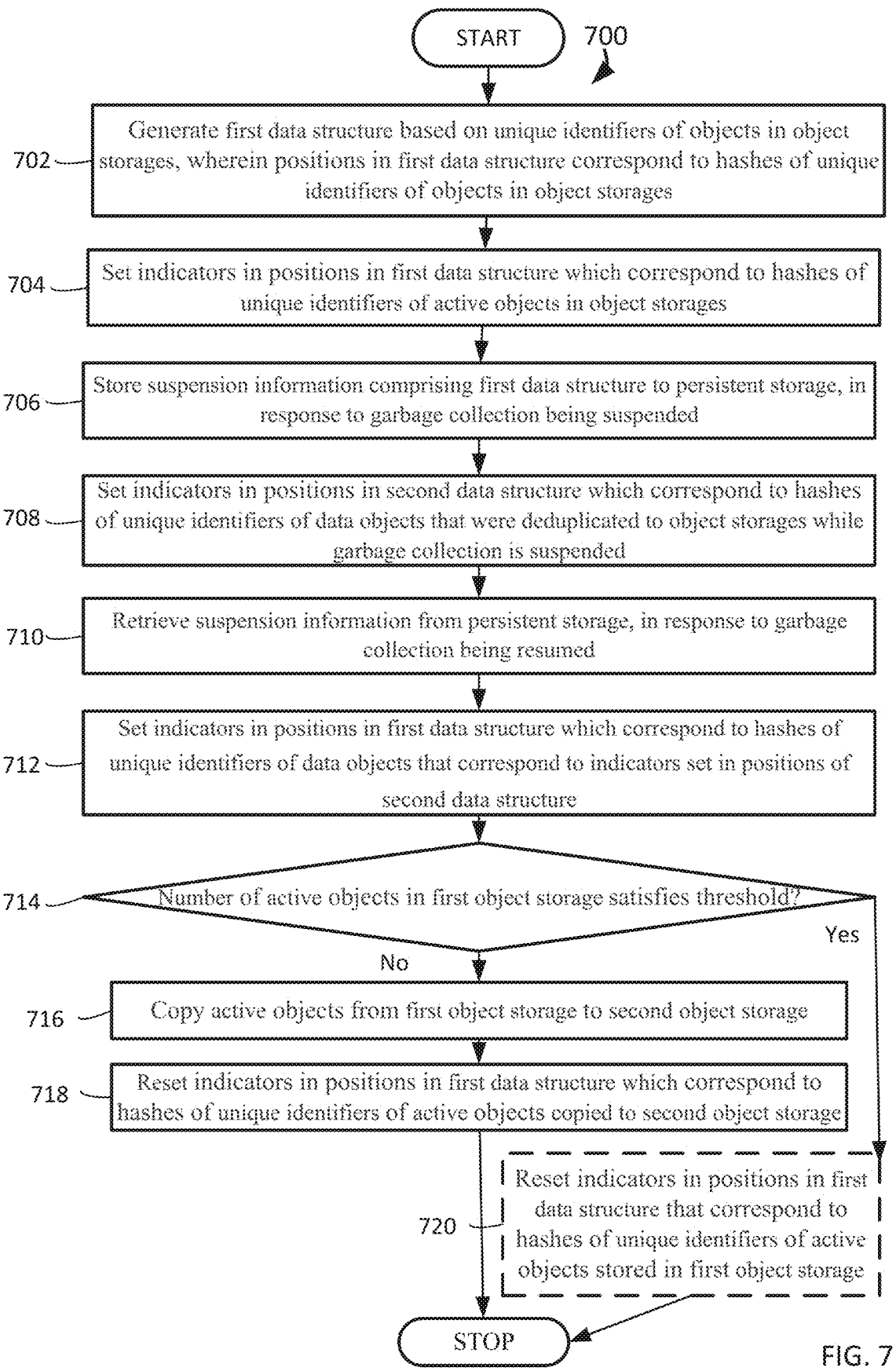
FIG. 7 is a flowchart that illustrates a method for resumable garbage collection, under an embodiment.

FIG. 7 is a flowchart that illustrates a method for resumable garbage collection, under an embodiment. Flowchart 700 illustrates method acts illustrated as flowchart blocks for certain steps involved in and/or between the clients 602-606 and/or the servers 608-610 of FIG. 6.

A first data structure is generated based on unique identifiers of objects in object storages, wherein positions in the first data structure correspond to hashes of the unique identifiers of the objects in the object storages, block 702. The system creates a hash vector for file segments. For example, and without limitation, this can include the garbage collector 624 storing an index of fingerprints for the file segments in the backup files 622 to a disk on the backup server 608, and then applying the perfect hash function 636 to the fingerprints 210 to generate the perfect hash vector 638.

After generating the first data structure, indicators are set in positions in the first data structure which correspond to hashes of unique identifiers of active objects in the object storages, block 704. The system uses live file segments to populate the hash vector. By way of example and without limitation, this can include the garbage collector 624 conducting a level-by-level review of the metadata segments for containers in the cleaning range 510 to identify their L0 and Lp references, which include the fingerprints of the live L0 data segments 512 in the containers 130-170, and then setting the bits in the perfect hash vector 638 that correspond to the hashes created by applying the perfect hash function 636 to the fingerprints of the live L0 data segments 512 in the containers 130-170.

When garbage collection is suspended, suspension information, comprising the first data structure, is stored to persistent storage, block 706. The system saves contextual information at the time of garbage collection suspension that enables the subsequent resumption of garbage collection. In embodiments, this can include the garbage collector 624 receiving a garbage collection suspension command, suspending data-movement to quiesce I/O operations to containers, persisting the perfect hash function 636, the perfect hash vector 638, and the identifier of container 170 to the backup server 608, allocating the bloom filter 642, disabling Lp metadata deduplication, switching ingest notifications to use the bloom filter 642, and resuming data-movement.

Following the storing of suspension information, indicators are set in positions in a second data structure which correspond to hashes of unique identifiers of data objects that are deduplicated to the object storages while the garbage collection is suspended, block 708. The system tracks the revival of dead segments. For example, and without limitation, this can include the garbage collector 624 setting the bits in the bloom filter 514 that correspond to the hashes created by applying the bloom filter hash functions 640 to the fingerprints A and B of the revived L0 data file segments A and B in the containers 130-170 in the cleaning range 510.

When garbage collection is resumed, the suspension information is retrieved from the persistent storage, block 710. The system retrieves contextual information that was stored at the time of garbage collection suspension to enable the current resumption of garbage collection. By way of example and without limitation, this can include the garbage collector 624 receiving a garbage collection resumption command, suspending data-movement to quiesce I/O operations to containers, retrieving the perfect hash function 636, the perfect hash vector 638, and the identifier of container 170 from the backup server 608, enabling Lp metadata deduplication, switching ingest notifications to use the perfect hash vector 638, and then resuming data-movement to allow ingest to continue writing to containers.

Having resumed garbage collection, indicators are set in positions in the first data structure which correspond to hashes of unique identifiers of data objects that correspond to indicators set in the positions of the second data structure, block 712. The system sets the bits in the perfect hash vector that correspond to the dead file segments that were revived while garbage collection was suspended. In embodiments, this can include the garbage collector 624 reviewing the metadata segments in the new containers 506 written during the suspension of the garbage collection to identify their L0 data segments references, which include the fingerprints A-F of the data file segments A-F in the containers 130-210, applying the bloom filter hash functions 640 to the fingerprints A-F to generate the bloom filter hashes of the fingerprints A-F, and comparing the bloom filter hashes of the fingerprints A-F to their corresponding bits in the bloom filter 514.

Since the bits 1 and 3 that are set to 1 in the bloom filter 514 corresponds to the bits for the revived file segment A, the garbage collector 624 applies the perfect hash function 636 to the corresponding fingerprint A to generate the perfect hash of the fingerprint A, and sets the bit to 1 in the perfect hash vector 636 that corresponds to the perfect hash of the fingerprint A. Similarly, the garbage collector 624 also applies the perfect hash function 636 to the corresponding fingerprint B to generate the perfect hash of the fingerprint B, and sets the bit to 1 in the perfect hash vector 636 that correspond to the perfect hash of the fingerprint B.

After the setting of indicators in the first data structure for active objects, a determination is made whether a number of active objects in a first object storage satisfies a threshold, block 714. The system evaluates whether a container needs to be cleaned. For example, and without limitation, this can include the garbage collector 624 identifying the fingerprints for the L0 data segments in the container 140, applying the perfect hash function 636 to these identified fingerprints to create hashes, and then checking the bits in the perfect hash vector 638 that correspond to these hashes. If the bit for a fingerprint's hash is set to 1 in the perfect hash vector 638, then the bit corresponds to a fingerprint of a live object. If the number of active objects in the first object storage does not satisfy the threshold, the method 700 continues to block 716 to clean the first storage object. If the number of active objects in the first object storage satisfies the threshold, the method 700 proceeds to block 720 to reset the indicators in the first data structure for active objects in the first storage object.

If the number of active objects in the first object storage does not satisfy the threshold, active objects are copied from the first object storage to a second object storage, block 716. The system copies live file segments in a container being cleaned to a new container. By way of example and without limitation, this can include the garbage collector 624 creating the new container 250, and then copying the live file segments, including the dead file segment A that was revived during the suspension of garbage cleaning, in the container 140 into the new container 250, thereby retaining the revival of the dead file segment A.

Following the copying of active objects to the second object storage, the indicators are reset in positions in the first data structure which correspond to hashes of unique identifiers of active objects copied to the second object storage, block 718. The system resets the bits in the hash vector for the copied file segments. In embodiments, this can include the garbage collector 624 resetting the bits in the perfect hash vector 638 that correspond to the perfect hashes for the fingerprints of the file segments in the new container 250, and then deleting the container 140. Then the method 700 stops.

If the number of the active objects in the first object storage satisfies the threshold, the indicators are optionally reset in positions in the first data structure that correspond to hashes of unique identifiers of the active objects stored in the first object storage, block 720. The system resets the bits in the hash vector for live file segments in a container that does not need cleaning. For example, and without limitation, this can include the garbage collector 624 determining that only 10% of the file segments in the container 140 are dead file segments, bypassing selection of the container 140 for cleaning, and resetting the bits in the perfect hash vector 638 that correspond to the hashes of the fingerprints for the file segments in the container 140, Although FIG. 7 depicts the blocks 702-720 occurring in a specific order, the blocks 702-720 may occur in another order. In other implementations, each of the blocks 702-720 may also be executed in combination with other blocks and/or some blocks may be divided into a different set of blocks.

Figure 8:
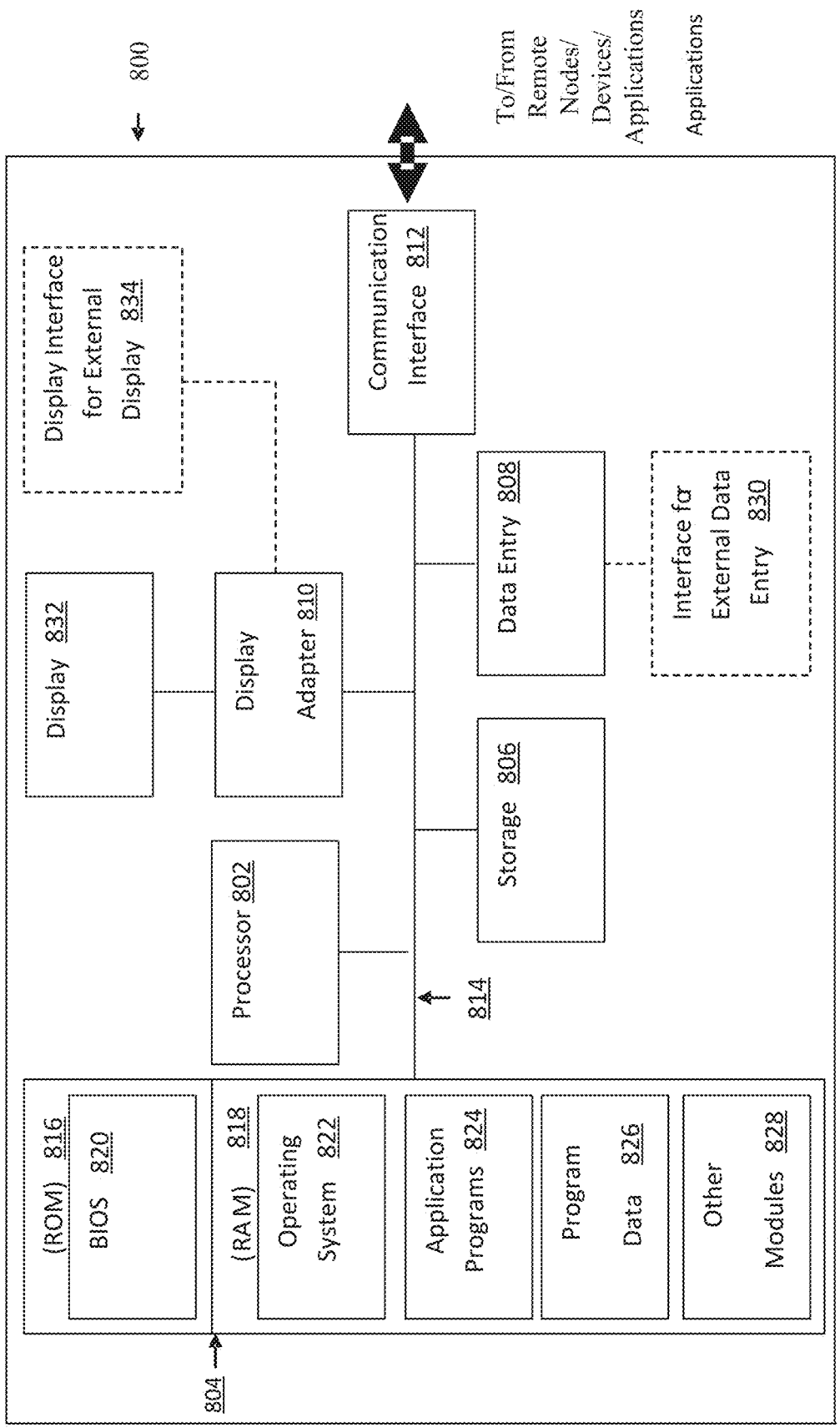
FIG. 8 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 8 may vary depending on the system implementation. With reference to FIG. 8, an exemplary system for implementing the subject matter disclosed herein includes a hardware device 800, including a processing unit 802, memory 804, storage 806, data entry module 808, display adapter 810, communication interface 812, and a bus 814 that couples elements 804-812 to the processing unit 802.

The bus 814 may comprise any type of bus architecture. Examples include a memory bus, a peripheral bus, a local bus, etc. The processing unit 802 is an instruction execution machine, apparatus, or device and may comprise a microprocessor, a digital signal processor, a graphics processing unit, an application specific integrated circuit (ASIC), a field programmable gate array (FPGA), etc. The processing unit 802 may be configured to execute program instructions stored in memory 804 and/or storage 806 and/or received via data entry module 808.

The memory 804 may include read only memory (ROM) 816 and random-access memory (RAM) 818. Memory 804 may be configured to store program instructions and data during operation of device 800. In various embodiments, memory 804 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 804 may also include nonvolatile memory technologies such as nonvolatile flash RAM (NVRAM) or ROM. In some embodiments, it is contemplated that memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 806, ROM 816 or RAM 818, including an operating system 822, one or more applications programs 824, program data 826, and other program modules 828. A user may enter commands and information into the hardware device 800 through data entry module 808. Data entry module 808 may include mechanisms such as a keyboard, a touch screen, a pointing device, etc. Other input devices (not shown) are connected to the hardware device 800 via external data entry interface 830. By way of example and not limitation, external input devices may include a microphone, joystick, game pad, satellite dish, scanner, or the like. In some embodiments, external input devices may include video or audio input devices such as a video camera, a still camera, etc. Data entry module 808 may be configured to receive input from one or more users of device 800 and to deliver such input to processing unit 802 and/or memory 804 via bus 814.

A display 832 is also connected to the bus 814 via display adapter 810. Display 832 may be configured to display output of device 800 to one or more users. In some embodiments, a given device such as a touch screen, for example, may function as both data entry module 808 and display 832. External display devices may also be connected to the bus 814 via external display interface 834. Other peripheral output devices, not shown, such as speakers and printers, may be connected to the hardware device 800.

The hardware device 800 may operate in a networked environment using logical connections to one or more remote nodes (not shown) via communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 812 may include logic configured to support direct memory access (DMA) transfers between memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of hardware device 800 illustrated in FIG. 8 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
generate a first data structure based on unique identifiers of objects in object storages, positions in the first data structure corresponding to hashes of the unique identifiers of the objects in the object storages;
set indicators in positions in the first data structure that correspond to hashes of unique identifiers of active objects in the object storages;
store suspension information to persistent storage in response to garbage collection being suspended, the suspension information comprising the first data structure;
set indicators in positions in a second data structure that correspond to hashes of unique identifiers of data objects that are deduplicated to the object storages while the garbage collection is suspended;
retrieve the suspension information from the persistent storage in response to the garbage collection being resumed;
set indicators in positions in the first data structure that correspond to hashes of unique identifiers of data objects that correspond to indicators set in the positions of the second data structure;
determine whether a number of active objects in a first object storage satisfies a threshold;
copy active objects from the first object storage to a second object storage in response to a determination that the number of active objects in the first object storage does not satisfy the threshold; and
reset the indicators in positions in the first data structure that correspond to hashes of unique identifiers of active objects copied to the second object storage.

2. The system of claim 1, wherein generating the first data structure comprises storing an index of unique identifiers of the objects in the object storages.

3. The system of claim 1, wherein setting the indicators in the positions in the first data structure comprises identifying the unique identifiers of the active objects by reviewing metadata associated with the objects in the object storages and generating hashes of the unique identifiers of the active objects.

4. The system of claim 1, wherein setting the indicators in the positions in the second data structure comprises identifying the unique identifiers of the data objects that were de-duplicated to object storages while garbage collection was suspended and generating hashes of the unique identifiers of the data objects.

5. The system of claim 1, wherein storing the suspension information comprises at least one of suspending object storage writes, allocating the second data structure, disabling de-duplication of metadata writes, assigning deduplicated data write notifications to the second data structure, and resuming the object storage writes.

6. The system of claim 1, wherein retrieving the suspension information comprises at least one of suspending the object storage writes, enabling the de-duplication of the metadata writes, assigning deduplicated data write notifications to the first data structure, and resuming the object storage writes, the suspension information comprising at least one of a hash function used to create the first data structure and an identifier of a most recently persisted object storage.

7. The system of claim 1, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the positions of the first data structure.

8. The system of claim 1, wherein copying the active objects from the first object storage to the second object storage comprises creating the second object storage and deleting the first object storage.

9. The system of claim 1, wherein the plurality of instructions further causes the processor to reset the indicators in positions in the first data structure that correspond to hashes of unique identifiers of the active objects stored in the first object storage, in response to a determination that the number of the active objects in the first object storage satisfies the threshold.

10. The system of claim 1, wherein at least one of the first data structure is implemented as a perfect hash vector, and the second data structure is implemented as a bloom filter.

11. A method comprising:
generating a first data structure based on unique identifiers of objects in object storages, positions in the first data structure corresponding to hashes of the unique identifiers of the objects in the object storages;
setting indicators in positions in the first data structure that correspond to hashes of unique identifiers of active objects in the object storages;
storing suspension information to persistent storage in response to garbage collection being suspended, the suspension information comprising the first data structure;
setting indicators in positions in a second data structure that correspond to hashes of unique identifiers of data objects that are deduplicated to the object storages while the garbage collection is suspended;
retrieving the suspension information from the persistent storage in response to the garbage collection being resumed;
setting indicators in positions in the first data structure that correspond to hashes of unique identifiers of data objects that correspond to indicators set in the positions of the second data structure;
determining whether a number of active objects in a first object storage satisfies a threshold;
copying active objects from the first object storage to a second object storage in response to a determination that the number of active objects in the first object storage does not satisfy the threshold; and
resetting the indicators in positions in the first data structure that correspond to hashes of unique identifiers of active objects copied to the second object storage.

12. The method of claim 11, wherein generating the first data structure comprises storing an index of unique identifiers of the objects in the object storages.

13. The method of claim 11, wherein setting the indicators in the positions in the first data structure comprises identifying the unique identifiers of the active objects by reviewing metadata associated with the objects in the object storages and generating hashes of the unique identifiers of the active objects.

14. The method of claim 11, wherein setting the indicators in the positions in the second data structure comprises identifying the unique identifiers of the data objects that were de-duplicated to object storages while garbage collection was suspended and generating hashes of the unique identifiers of the data objects.

15. The method of claim 11, wherein storing the suspension information comprises at least one of suspending object storage writes, allocating the second data structure, disabling de-duplication of metadata writes, assigning deduplicated data write notifications to the second data structure, and resuming the object storage writes.

16. The method of claim 11, wherein retrieving the suspension information comprises at least one of suspending the object storage writes, enabling the de-duplication of the metadata writes, assigning deduplicated data write notifications to the first data structure, and resuming the object storage writes, the suspension information comprising at least one of a hash function used to create the first data structure and an identifier of a most recently persisted object storage.

17. The method of claim 11, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the positions of the first data structure.

18. The method of claim 11, wherein copying the active objects from the first object storage to the second object storage comprises creating the second object storage and deleting the first object storage.

19. The method of claim 11, wherein the method further comprises resetting the indicators in positions in the first data structure that correspond to hashes of unique identifiers of the active objects stored in the first object storage, in response to a determination that the number of the active objects in the first object storage satisfies the threshold.

20. The method of claim 11 wherein at least one of the first data structure is implemented as a perfect hash vector, and the second data structure is implemented as a bloom filter.

21. A computer program product, comprising a non-transitory computer-readable medium having a computer-readable program code embodied therein to be executed by one or more processors, the program code including instructions to:
generate a first data structure based on unique identifiers of objects in object storages, positions in the first data structure corresponding to hashes of the unique identifiers of the objects in the object storages;
set indicators in positions in the first data structure that correspond to hashes of unique identifiers of active objects in the object storages;
store suspension information to persistent storage in response to garbage collection being suspended, the suspension information comprising the first data structure;
set indicators in positions in a second data structure that correspond to hashes of unique identifiers of data objects that are deduplicated to the object storages while the garbage collection is suspended;
retrieve the suspension information from the persistent storage in response to the garbage collection being resumed;
set indicators in positions in the first data structure that correspond to hashes of unique identifiers of data objects that correspond to indicators set in the positions of the second data structure;
determine whether a number of active objects in a first object storage satisfies a threshold;
copy active objects from the first object storage to a second object storage in response to a determination that the number of active objects in the first object storage does not satisfy the threshold; and
reset the indicators in positions in the first data structure that correspond to hashes of unique identifiers of active objects copied to the second object storage.

22. The computer program product of claim 21, wherein generating the first data structure comprises storing an index of unique identifiers of the objects in the object storages.

23. The computer program product of claim 21, wherein setting the indicators in the positions in the first data structure comprises identifying the unique identifiers of the active objects by reviewing metadata associated with the objects in the object storages and generating hashes of the unique identifiers of the active objects.

24. The computer program product of claim 21, wherein setting the indicators in the positions in the second data structure comprises identifying the unique identifiers of the data objects that were de-duplicated to object storages while garbage collection was suspended and generating hashes of the unique identifiers of the data objects.

25. The computer program product of claim 21, wherein storing the suspension information comprises at least one of suspending object storage writes, allocating the second data structure, disabling de-duplication of metadata writes, assigning deduplicated data write notifications to the second data structure, and resuming the object storage writes.

26. The computer program product of claim 21, wherein retrieving the suspension information comprises at least one of suspending the object storage writes, enabling the de-duplication of the metadata writes, assigning deduplicated data write notifications to the first data structure, and resuming the object storage writes, the suspension information comprising at least one of a hash function used to create the first data structure and an identifier of a most recently persisted object storage.

27. The computer program product of claim 21, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the positions of the first data structure.

28. The computer program product of claim 21, wherein copying the active objects from the first object storage to the second object storage comprises creating the second object storage and deleting the first object storage.

29. The computer program product of claim 21, wherein the program code includes further instructions to reset the indicators in positions in the first data structure that correspond to hashes of unique identifiers of the active objects stored in the first object storage, in response to a determination that the number of the active objects in the first object storage satisfies the threshold.

* * * * *